United States Patent [19]

Makino et al.

[11] Patent Number: 5,231,595

[45] Date of Patent: Jul. 27, 1993

[54] PYROMETER

[75] Inventors: Toshiro Makino, Kyoto; Hiroji Tsujimura; Jiro Arima, both of Osaka, all of Japan

[73] Assignee: Minolta Camera Kabushiki Kaisha, Osaka, Japan

[21] Appl. No.: 782,750

[22] Filed: Oct. 18, 1991

Related U.S. Application Data

[63] Continuation of Ser. No. 203,003, Jun. 6, 1983, abandoned.

[30] Foreign Application Priority Data

Jun. 6, 1987 [JP] Japan ............................ 62-141738
Jun. 6, 1987 [JP] Japan ............................ 62-141739

[51] Int. Cl.⁵ .................................................. G01J 5/60
[52] U.S. Cl. ................................ 364/557; 250/339; 374/126; 356/45
[58] Field of Search ............... 364/557, 525; 374/126, 374/127, 128, 129; 250/339; 356/43, 45

[56] References Cited

U.S. PATENT DOCUMENTS

| | | | |
|---|---|---|---|
| 3,796,099 | 3/1974 | Shimotsuma et al. | 374/126 |
| 4,172,383 | 10/1979 | Iuchi | 374/126 X |
| 4,313,344 | 2/1982 | Brogardh et al. | 374/126 |
| 4,411,519 | 10/1983 | Tagami | 356/45 |
| 4,465,382 | 8/1984 | Iuchi et al. | 374/126 X |
| 4,561,786 | 12/1985 | Anderson | 374/128 X |
| 4,647,774 | 3/1987 | Brisk et al. | 250/338 |
| 4,659,234 | 4/1987 | Brouwer et al. | 374/126 X |
| 4,708,474 | 11/1987 | Suarez-Gonzalez | 374/127 X |
| 4,708,493 | 11/1987 | Stein | 374/128 |
| 4,729,668 | 3/1988 | Angel et al. | 374/127 |
| 4,791,585 | 12/1988 | Maki et al. | 364/557 |
| 4,797,840 | 1/1989 | Fraden | 364/557 |
| 4,859,065 | 8/1989 | Bibby | 356/45 |
| 4,974,182 | 11/1990 | Tank | 374/126 X |

FOREIGN PATENT DOCUMENTS

| | | | |
|---|---|---|---|
| 52-47788 | 4/1977 | Japan . | |
| 53-39784 | 4/1978 | Japan . | |
| 0144513 | 11/1980 | Japan | 374/126 |
| 56-130137 | 10/1981 | Japan . | |
| 56-130622 | 10/1981 | Japan . | |
| 56-130623 | 10/1981 | Japan . | |
| 0020627 | 2/1982 | Japan | 374/127 |
| 60-54936 | 4/1985 | Japan . | |
| 60-54937 | 4/1985 | Japan . | |
| 61-30727 | 2/1986 | Japan . | |
| 61-86621 | 5/1986 | Japan . | |
| 62-29647 | 7/1986 | Japan . | |
| 62-1202 | 1/1987 | Japan . | |
| 62-15424 | 1/1987 | Japan . | |

OTHER PUBLICATIONS

Rucklidge et al. "A Beginner's Guide to Infra-Red Thermometers" Land Instruments Inc., pp. 9.1-9.2(b), 1979.

Journal of Physics E, Science Instrumentation, vol. 13, 1980.

Primary Examiner—Parshotam S. Lall
Assistant Examiner—Michael Zanelli
Attorney, Agent, or Firm—Price, Gess & Ubell

[57] ABSTRACT

A pyrometer includes a light source capable of emitting light to at least two wavelengths to a target to be measured. A light measuring member measures the light source and provides output signals representative of those two wavelengths. A second light measuring member measures light reflected by the target and provides second signals corresponding to the two wavelengths. A third light measuring member measures the intensity of the light radiated by the target with respect to those two wavelengths to produce third signals. An emissivity is assumed for the target based on the predetermined wavelengths, and a temperature is calculated on the basis of the minimum value of the difference between the assumed radiation intensity calculated according to the assumed emissivity of the target and the measured radiation intensity in accordance with the third signals.

23 Claims, 9 Drawing Sheets

$\varepsilon(\lambda_1) = 0.853$
$\varepsilon(\lambda_2) = 0.862$
$T = 375°C$

PYROMETER

This is a continuation of application Ser. No. 203,003, filed on Jun. 6, 1988, now abandoned.

BACKGROUND OF THE INVENTION

1. Field of the Invention

The present invention relates to a pyrometer, more particularly, it relates to a pyrometer for measuring the temperature of a target through light as a medium.

2. Description of the Prior Art

In such a pyrometer, it is necessary to know the emissivity of a target to be measured, but in general, such emissivity can not be known. Therefore, in a number of previously proposed pyrometers, the emissivities of a target to be measured are assumed as follows: In Japanese Laid-Open Patent Application No. 130622/1981, light having two different colors (two different wavelengths $\lambda_1$, $\lambda_2$) is measured, and the emissivity $\epsilon$ in the wavelength $\lambda_1$ is assumed to be equal to the emissivity $\epsilon$ in the wavelength $\lambda_2$. In the other Japanese Laid-Open Patent Application No. 130623/1981, light having three different colors (three different wavelengths) is measured, and the emissivities $\epsilon(\lambda)$ in respective wavelengths are assumed that $\epsilon(\lambda) = \exp.(a_0 + a_1\lambda)$, wherein $a_0$ and $a_1$ represent constants respectively. Furthermore, in the U.S. Pat. No. 4,411,519, three temperatures $T_{12}$, $T_{23}$, and $T_{31}$ are calculated with assuming $\epsilon(\lambda_1) = \epsilon(\lambda_2)$, $\epsilon(\lambda_2) = \epsilon(\lambda_3)$, $\epsilon(\lambda_3) = \epsilon(\lambda_1)$ respectively, and a true temperature T is obtained by $T = (T_{12} + T_{23} + T_{31})/3$.

Meanwhile, in the other Japanese Laid-Open Patent Application No. 30727/1986, the intensities $L(\lambda_1)$ and $L(\lambda_2)$ of light reflected by the target are measured in two different wavelengths $\lambda_1$, $\lambda_2$ respectively, and the temperature is calculated on the basis of the measured light intensities $L(\lambda_1)$, $L(\lambda_2)$, and a reflected light intensity ratio $L(\lambda_1)/L(\lambda_2)$ represented by the emissivities $\epsilon(\lambda_1)$, $\epsilon(\lambda_2)$ as follows:

$$L(\lambda_1)/L(\lambda_2) = \{1 - \epsilon(\lambda_1)\}/\{1 - \epsilon(\lambda_2)\} \quad (A).$$

Namely, assuming that the measured radiation intensity in wavelength $\lambda$ is $D(\lambda)$ and the radiation intensity of blackbody in the wavelength $\lambda$ at temperature T is $D_0(\lambda, T)$, the following equation is established:

$$\epsilon(\lambda) = D(\lambda)/D_0(\lambda, T) \quad (B).$$

Here, the temperature T can be calculated in accordance with the equation (A), since the unknown factor is only T in the equation (A) if $\epsilon(\lambda)$ shown in the equation (B) is substituted to the equation (A). $D_0(\lambda, T)$ can be calculated in accordance with the well-known Planck formula and constants peculiar to the device.

However, in Japanese Patent Laid-Open Nos. 130622/1981 and 7529/1982, since it is assumed that $\epsilon(\lambda_1) = \epsilon(\lambda_2)$, the true temperature can be calculated only when a spectral characteristic of emissivity is constant. In other words, when the spectral characteristic of emissivity is not constant, the assumption $\epsilon(\lambda_1) = \epsilon(\lambda_2)$ itself is erroneous, so that the true temperature can not be calculated. In either case, in Japanese Patent Laid-Open No. 130622/1981, U.S. Pat. No. 4,411,519 and including No. 130623/1981, since information on the reflected light is not included in the assumption of an emissivity, the true temperature can not be obtained except in the case of constant spectral characteristic of emissivity.

On the other hand, in the calculation in Japanese Patent Laid-Open No. 30727/1986, there may be the case that two different temperatures are obtained. That is, in accordance with this prior art reference, the temperature calculation is performed by utilizing an inverse of the Planck formula. In general, utilization of the inverse of the Planck formula, however, results in undesirably deriving two solutions or no solution.

SUMMARY OF THE INVENTION

Therefore, it is an object of the present invention to provide a pyrometer which is possible to calculate the true temperature even when the spectral characteristic of emissivity is not constant.

In one configuration of the present invention, a pyrometer includes a light source for emitting light having at least two different wavelengths to the target to be measured. A first measuring member measures the light emitted by the light emitting means to produce corresponding first signals representative of each of the two wavelengths. A second light measuring member measures the light reflected by the target with respect to those two wavelengths to produce second signals. A third light measuring member measures the intensity of light radiated by the target with respect to the same two wavelengths to produce third signals. An assumption of the emissivity of the target is made on the basis of the following equation:

$$\epsilon(\lambda) = 1 - k \times L(\lambda)$$

wherein,
$\epsilon(\lambda)$ represents an assumed emissivity of the target with respect to a wavelength $\lambda$,
k represents a constant, and
$L(\lambda)$ represents information as to the second signal at a wavelength $\lambda$.

Temperature calculation is made on the basis of the minimum value of the difference between the assumed radiation intensity calculated in accordance with the assumed emissivity of the target and the actual measured radiation intensity in accordance with the third signals.

Thus, in the present invention, since measured reflection information is included in the assumed emissivity, the true temperature can be calculated even when the actual emissivity spectrum is complicated. In addition, since a temperature where the difference between the assumed radiation intensity and measured radiation intensity is minimized is obtained, measuring errors of the radiation intensity and reflection intensity etc. can be prevented.

Likewise, when the background radiation affecting the measured radiation intensity of the target is present, the pyrometer may be constructed to comprise means for supplying a background radiation intensity of light coming from the background of the target, and the temperature calculating means can include means for calculating the temperature of the target, on the basis of the minimum difference between the measured radiation intensity and the sum of the background radiation intensity and the assumed radiation intensity, to remove such influence of the background radiation.

An alternative embodiment of the present invention includes a light source emitting light having at least three wavelengths to the target to be measured. A first light measuring member measures the light emitted by the light source and produces corresponding first signals for each of the three wavelengths. A second light measuring member measures the light reflected by the target with respect to at least the three wavelengths to produce corresponding second signals. A third light measuring member measures the light radiated by the target with respect to the same three wavelengths to produce third signals. The emissivity of the target is then assumed on the basis of the following equation:

$$\epsilon(\lambda) = 1 - k(\lambda) \times L(\lambda)$$

wherein, $\epsilon(\lambda)$ represents an assumed emissivity of the target with respect to a wavelength $\lambda$, $k(\lambda)$ represents a function of wavelength $\lambda$, $L(\lambda)$ represents information as to the second signal with respect to a wavelength $\lambda$.

The temperature is calculated for the target based on the assumed emissivity and the first through third signals for each wavelength.

According to this configuration, since the emissivity $\epsilon$ is assumed as $\epsilon = 1 - k(\lambda) \times L(\lambda)$ and k is a function of a wavelength $\lambda$, an accurate temperature can be calculated even when k varies on wavelength.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which.

DETAILED DESCRIPTION OF THE PREFERRED EMBODIMENT

One embodiment of the present invention will now be described in conjunction with the drawings.

Figure 1:
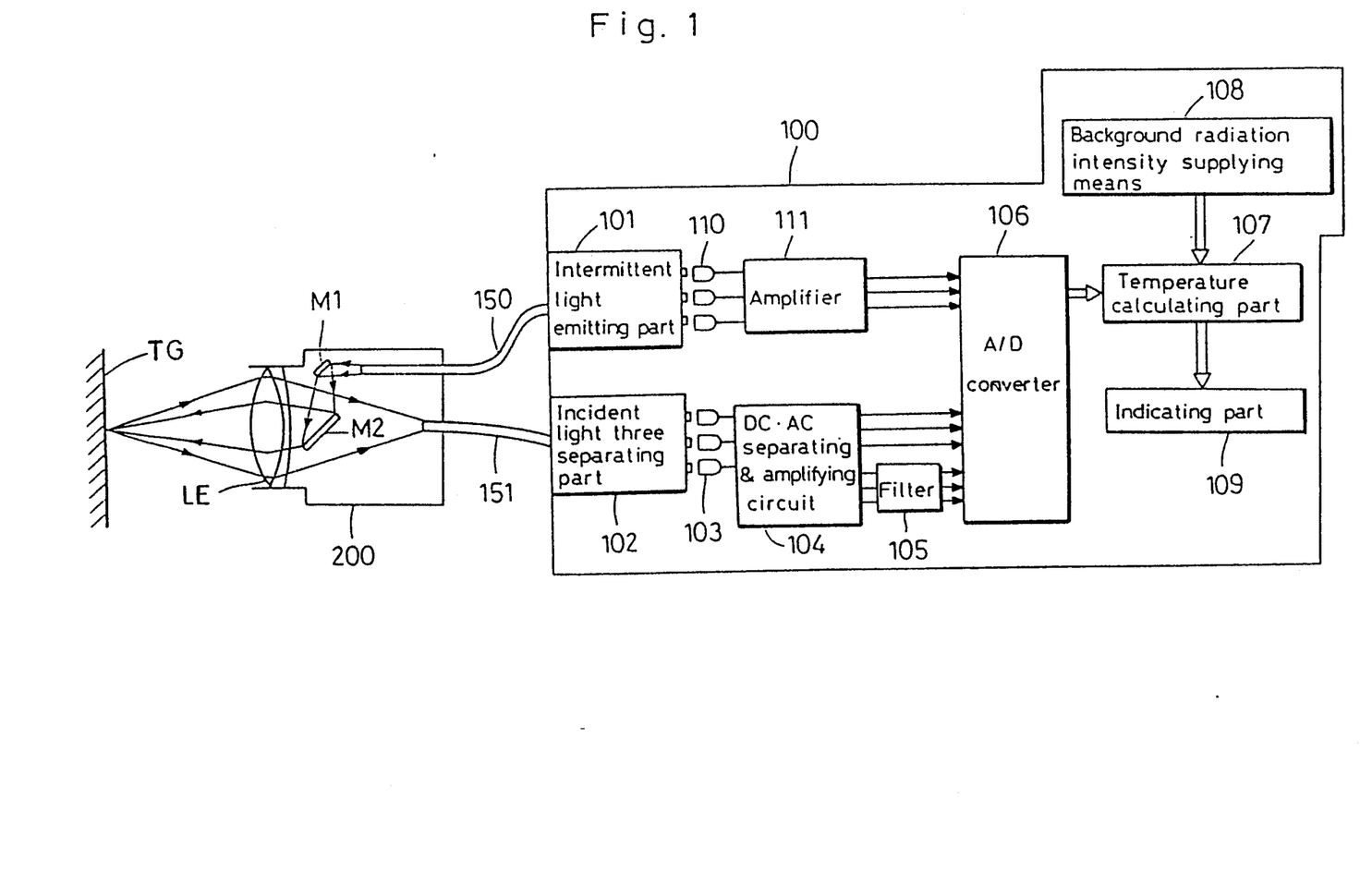
FIG. 1 is a schematic construction diagram of a pyrometer of one embodiment of the present invention.

FIG. 1 is a construction diagram of a pyrometer of one embodiment of the present invention. In the present embodiment, light having three different wavelengths $\lambda_1$, $\lambda_2$, $\lambda_3$ will be measured. An intermittent light emitting part 101 constituting a body 100 of the pyrometer comprises a light source which produces reference light including light having three different wavelengths $\lambda_1$, $\lambda_2$, $\lambda_3$ and a mechanism which intermits the reference light from the light source, and emits intermittent light to an optical fiber 150. The intermittent reference light is directed to a measuring head part 200 through the optical fiber 150 and reflected by mirrors $M_1$, $M_2$. The reflected light is focused through the central portion of a lens LE and projected toward a target TG.

The measuring head part 200 receives light radiated by the target TG itself and the reference light reflected by the target TG simultaneously through an identical angle of view, and transmits them to the body 100 through the peripheral portion of the lens LE and an optical fiber 151. The measured light is separated into three different wavelengths in an incident light separating part 102 of the body 100, and respective intensities of light in respective wavelengths are converted into corresponding electric signals by respective sensors 103. These electric signals are divided into DC components corresponding to the radiated light intensity and AC components corresponding to the reflected light intensity at each wavelength and are amplified by a DC.AC separating & amplifying circuit 104. The amplified signals are converted from an analog form into corresponding digital form by an A/D converter 106 and the converted digital signals are transmitted to a temperature calculating part 107.

At the same time, the reference light intensity is also converted into electric signals at each wavelength by sensors 110, amplified by an amplifier 111 and inputted to the temperature calculating part 107 after being converted into digital signals by the A/D converter. Meanwhile, the background radiation intensity is also inputted to the temperature calculating part 107 from a background radiation intensity supplying means 108. In the temperature calculating part, a plurality of values, obtained when a blackbody having temperature T is measured, are prepared at each wavelength, and the temperature of the target is calculated with use of these the values. The calculated temperature and emissivity of each wavelength are sent to an indicating part or display 109 to be indicated.

Figure 2:
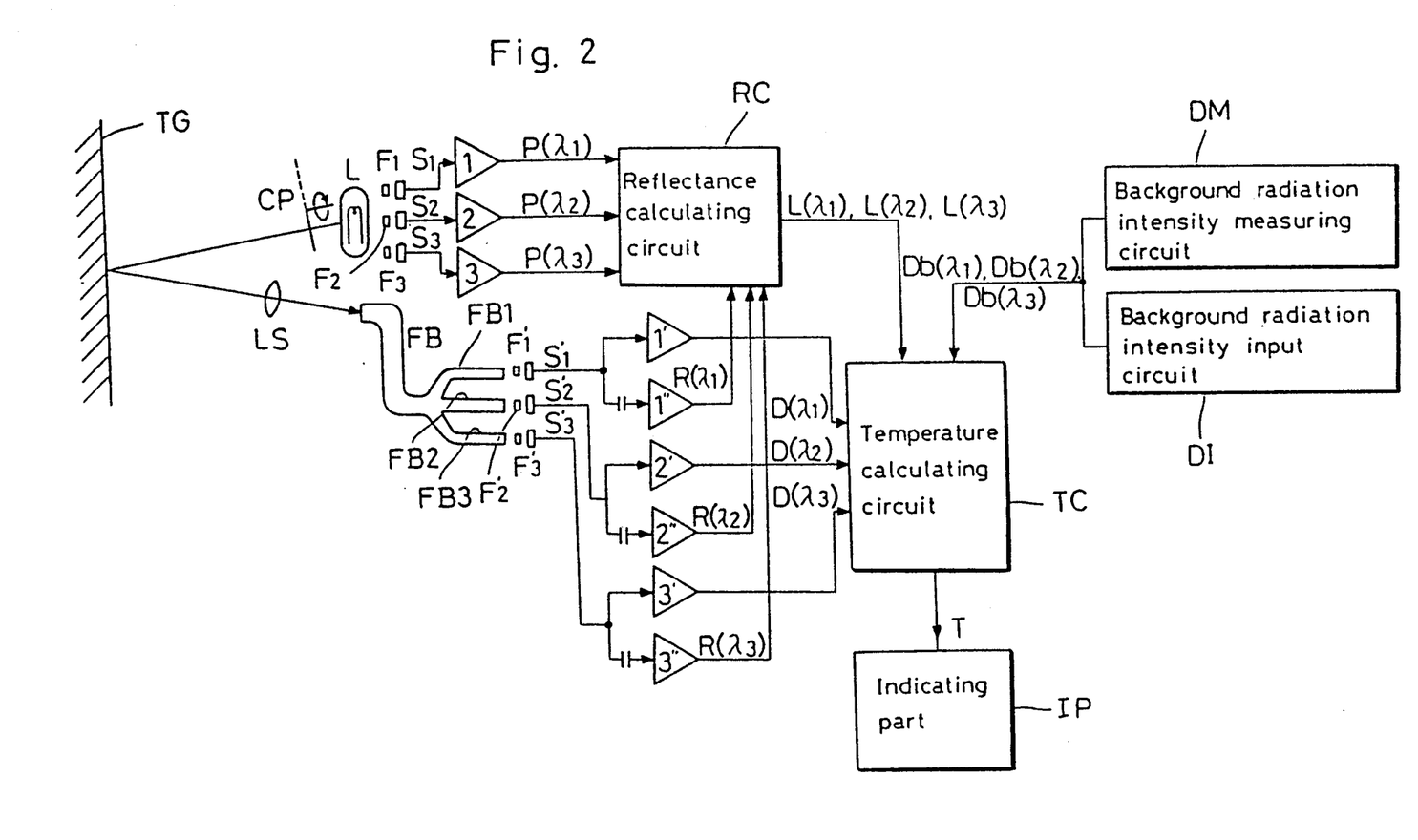
FIG. 2 is a specific construction diagram of the embodiment in which the construction of FIG. 1 is partly modified.

Next, a specific configuration of the pyrometer modified slightly from the configuration of FIG. 1 will be explained with reference to FIG. 2. In FIG. 2, a light emitting means comprises a light source L which produces the reference light including three different wavelengths $\lambda_1$, $\lambda_2$, $\lambda_3$ and a chopper CP which intermits the reference light from the light source L, and irradiates the intermittent light to the target TG. The chopper CP is realized by rotating a rotor having light transmitting and interrupting portions. LS indicates a lens which condenses light from the target TG and the condensed light is divided into three different optical paths by a fiber FB. The light transmitted through the fiber FB1, FB2 and FB3 are received respectively by optical detectors $S'_1$, $S'_2$, and $S'_3$ through optical filters $F'_1$, $F'_2$ and $F'_3$ which transmit the light having wavelengths of $\lambda_1$, $\lambda_2$, and $\lambda_3$. In the optical detectors $S'_1$, $S'_2$, and $S'_3$, both the radiation intensity $B(\lambda, T)$ of the light radiated from the target TG itself and an intensity signal of the reflected light of the light source L reflected by the target TG are detected in superposition. The radiation intensity $B(\lambda, T)$ of the light radiated by the target TG itself among output signals of the optical detectors $S'_1$, $S'_2$, and $S'_3$ is constant, so that it is detected as the DC signals, amplified by the DC amplifiers 1', 2' and 3' and outputted as the radiation intensity measured values $D(\lambda_1)$, $D(\lambda_2)$, $D(\lambda_3)$ with respect to wavelengths $\lambda_1$, $\lambda_2$, $\lambda_3$. The radiation intensity measuring means aforementioned with respect to three-wavelength light is constituted by the DC amplifiers 1', 2' 3', optical filters $F'_1$, $F'_2$, $F'_3$ and optical detectors $S'_1$, $S'_2$, $S'_3$.

Among output signals of the optical detectors $S'_1$, $S'_2$, $S'_3$, the intensity signal of light reflected by the target TG is, since light radiated to the target TG from the light source is modulated to intermittent light by the chopper CP, detected as the AC signals through a DC cut capacitor and the detected signals are amplified respectively by the AC amplifiers $1''$, $2''$, $3''$, and outputted as intensity signals $R(\lambda_1)$, $R(\lambda_2)$, $R(\lambda_3)$ of the reflected light with respect to the wavelengths $\lambda_1$, $\lambda_2$, $\lambda_3$. The aforesaid reflected light measuring means is constituted by the AC amplifiers $1''$, $2''$, $3''$, optical filters $F'_1$, $F'_2$, $F'_3$ and optical detectors $S'_1$, $S'_2$, $S'_3$.

Now, since the intensity of reference light with respect to wavelengths $\lambda_1$, $\lambda_2$, $\lambda_3$ is necessary for calculating the reflectance, there are provided optical detectors $S_1$, $S_2$, $S_3$. The optical detectors $S_1$, $S_2$, $S_3$ are faced to the light source L through the optical filters $F_1$, $F_2$, $F_3$ which transmit only the light corresponding to the wavelengths $\lambda_1$, $\lambda_2$, $\lambda_3$ respectively. Though the light source L emits light of various wavelengths, the optical detector $S_1$, detects therefrom the light intensity of wavelength component of $\lambda_1$, which is necessary for calculating the reflectance. Similarly, the optical detectors $S_2$, $S_3$ detect the light intensity of wavelength components of $\lambda_2$, $\lambda_3$. Detected outputs of the optical detectors $S_1$, $S_2$, $S_3$ are amplified respectively by the DC amplifiers 1, 2, 3 for correcting the light source to obtain intensity signals $P(\lambda_1)$, $P(\lambda_2)$, $P(\lambda_3)$ of the reference light with respect to the wavelengths $\lambda_1$, $\lambda_2$ and $\lambda_3$. Output signals $R(\lambda_1)$, $R(\lambda_2)$, $R(\lambda_3)$ of the AC amplifiers $1''$, $2''$, $3''$ and output signals $P(\lambda_1)$, $P(\lambda_2)$, $P(\lambda_3)$ of the DC amplifiers 1, 2, 3 are inputted to a reflectance calculating circuit RC, and the measured reflectance $L(\lambda_1)=R(\lambda_1)/P(\lambda_1)$ of the target TG at wavelength $\lambda_1$, and the measured reflectances $L(\lambda_2)=R(\lambda_2)/P(\lambda_2)$, $L(\lambda_3)=R(\lambda_3)/P(\lambda_3)$ of the target TG at wavelengths $\lambda_2$, $\lambda_3$ are calculated. Calculated outputs $L(\lambda_1)$, $L(\lambda_2)$, $L(\lambda_3)$ of the reflectance calculating circuit RC are inputted to the temperature calculating circuit TC together with radiation intensity measured values $D(\lambda_1)$, $D(\lambda_2)$, $D(\lambda_3)$ obtained from the DC amplifiers $1'$, $2'$, $3'$, and the true temperature is calculated. A method of calculating the true temperature from these data will be explained hereinbelow.

When a target to be measured is a blackbody, a light energy of wavelength $\lambda$ or a radiation intensity $E(\lambda, T)$ radiated per unit area from the target can be given by the Planck formula. Now, if a measured value $Do(\lambda, T)$ is obtained by measuring the radiation intensity of the target at the wavelength $\lambda$, $$Do(\lambda, T) = \alpha \times E(\lambda, T) \tag{1}$$

is established. Here, $\alpha$ is a constant determined by a measuring device, and specifically decided by a calibration measurement. Thus, the temperature T is obtained by calculating the equation (1). Though the target to be measured was deemed as a blackbody, in practice, the target is not actually a blackbody, so that its emissivity must be detected to correct the temperature which is obtained as the blackbody. When the emissivity of the non-blackbody is $\epsilon(\lambda, T)$, radiation intensity $B(\lambda, T)$ of light having the wavelength $\lambda$ at the temperature T thereof is, $$B(\lambda, T) = \epsilon(\lambda, T) \times E(\lambda, T),$$

thus the radiation intensity measured value $D(\lambda)$ of any target becomes, $$D(\lambda) = \alpha \times \epsilon(\lambda, T) \times E(\lambda, T) \tag{2}$$

where, $\alpha$ is a constant determined by a measuring device.

Figure 3:
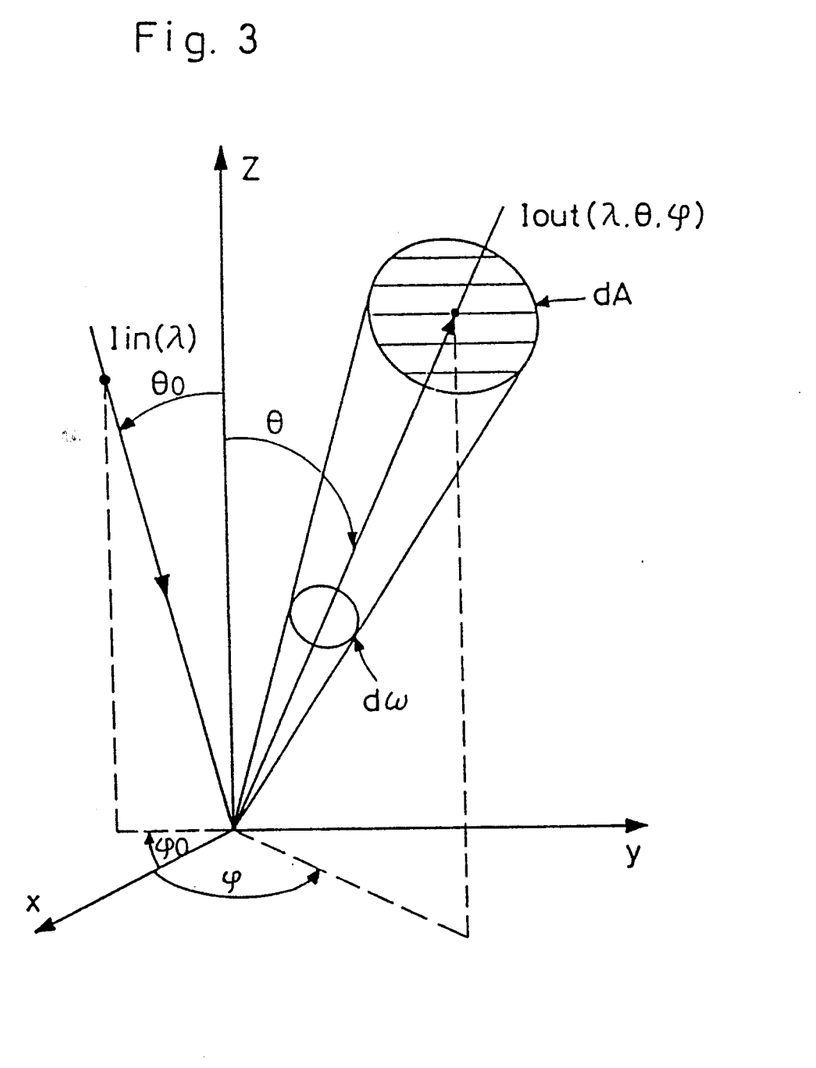
FIG. 3 is an explanatory view with respect to a reflectance.

Next, as shown in FIG. 3, when a beam of light 4 of wavelength $\lambda$ having the light intensity $Iin(\lambda)$ is incident to the target TG and its reflected light 5 is reflected in various directions in angle $\theta$ at the light intensity $Iout(\lambda, \theta, \phi)$, its hemispherical reflectance $\gamma(\lambda, T)$ is represented by the following equation (3).

$$r(\lambda, T) = \frac{\frac{1}{2\pi} \int_0^{2\pi} \int_0^{\frac{\pi}{2}} Iout(\lambda\theta\phi)\sin\theta d\theta d\phi}{Iin(\lambda)} \tag{3}$$

Relationship between the hemispherical reflectance $\gamma(\lambda, T)$ and emissivity $\epsilon(\lambda, T)$ with respect to a non-transmitting target becomes, $$\epsilon(\lambda, T) + \gamma(\lambda, T) = 1 \tag{4}$$

While, $$L(\lambda) = \alpha' \times k'(\lambda) \times \gamma(\lambda, T) \tag{5}$$

is established between the hemispherical reflection intensity $\gamma(\lambda, T)$ and measured reflection $L(\lambda)$. From the above, equations (4), (5), equation (6) is obtained.

$$\epsilon(\lambda, T) = 1 - \left( \frac{1}{\alpha' \times k'(\lambda)} \right) \times L(\lambda) \tag{6}$$

Here, the same as the aforesaid $\alpha$, $\alpha'$ is a constant determined by the measuring device, and $k'(\lambda)$ is a coefficient relative to an angular characteristic of the reflected light decided by the surface condition of the target to be measured. More specifically, when measurement was performed by the reflected light measuring device having the measured light view angle $\Delta w$ at the position of $\theta = \theta m$, $k'(\lambda)$ becomes as shown in equation (7).

$$k'(\lambda) = \frac{\frac{1}{2\pi} \int \int_{\Delta\omega} Iout(\lambda, \theta, \phi)\sin\theta d\theta d\phi}{\frac{1}{2\pi} \int_0^{2\pi} \int_0^{2\pi} Iout(\lambda, \theta, \phi)\sin\theta d\theta d\phi} \tag{7}$$

That is, $k'(\lambda)$ is the ratio of actually measured reflected light to the whole reflected light.

Now, it is believed that a difference of $k'(\lambda)$ due to wavelength is very small when the wavelength close to the measured wavelength is used.

Thus, the emissivity $\epsilon(\lambda, T)$ is shown as the following equation, $$\epsilon(\lambda, T) = 1 - k \times L(\lambda) \tag{8}$$

Where, the coefficient k is a constant. Now, in calculating the temperature T from the above equations (2) and (8), the number of unknowns totals $(n+2)$ consisting of the coefficient k, the emissivity $\epsilon(\lambda, T)$ and the temperature T, while the number of conventional equations is 2n (n represents the number of reference wavelengths). Accordingly, if n≧2 is satisfied, these simultaneous equations can be solved. Thus, T can be calculated in principle if two wavelengths are used. However, the assumption of equation (2) and equation (8) is not always established completely, on the contrary it is believed that minor errors are inevitable in most cases. Measuring errors are, in practice, inevitable.

Thus, it is not preferable to calculate T directly from equation (8) as the resulting temperature T is influenced by measuring errors the same as the aforesaid Japanese Patent Laid-Open No. 30727/1986. Therefore, the temperature is calculated so as to minimize the difference between the assumed radiation intensity and measured radiation intensity to restrain the influence of such errors as much as possible. Now, the temperature calculation performed by taking into account the influence of so-called background radiation intensity, whereby not only the intensity emitted from the target itself but also the radiation intensities of the other objects reflected by said target all entered into a measuring system, will be explained.

First, coefficient h(T) is defined as a function which evaluates the degree of errors between the assumed radiation intensity $\epsilon(\lambda, T) \times Do(\lambda, T)$ [$=\{1-k\times L(\lambda)\}\times Do(\lambda, T)$] and radiation intensity measured value $D(\lambda)$. At this time, by measuring the background radiation intensity $Db(\lambda)$ with the measuring circuit DM in FIG. 2, or by using $Db(\lambda)$ inputted from the background radiation intensity input circuit DI when $Db(\lambda)$ is known, the assumed radiation intensity is determined as $[\epsilon(\lambda, T)\times Do(\lambda, T)+\{1-\epsilon(\lambda, T)\}\times Db(\lambda)]$, and h(T) is represented as a sum of squares every wavelength of the difference between the assumed radiation intensity and radiation intensity measured value $D(\lambda)$ as shown in equation (9).

$$h(T) = \sum_{i=1}^{n} \left( \frac{\{\epsilon(\lambda i, T) \times Do(\lambda i, T) + (1 - \epsilon(\lambda i, T) \times Db(\lambda i)\} - D(\lambda i)}{D(\lambda i)} \right)^2 \quad (9)$$

$$= \sum_{i=1}^{n} \left( \frac{\{1 - k \times L(\lambda i)\} \times Do(\lambda i, T) + k \times L(\lambda i) \times Db(\lambda i)}{D(\lambda i)} - 1 \right)^2$$

Here, a denominator $D(\lambda_1)$ serves to delete the weight by the wavelength. Since the equation (9) is a quadratic equation of unknown k, k(=kmin) which makes h(T) minimum with respect to a certain temperature T, takes an extreme value, thus it can be obtained from dh(T)/dk=0 as equation (10), and h(T) is obtained by substituting kmin of equation (10) in equation (9).

$$kmin = \frac{\sum_{i=1}^{n} \left\{ \frac{L(\lambda i)(Do(\lambda i, T) - Db(\lambda i))}{D(\lambda i)} \left( \frac{Do(\lambda i, T)}{D(\lambda i)} - 1 \right) \right\}}{\sum_{i=1}^{n} \left( \frac{L(\lambda i)(Do(\lambda i, T) - Db(\lambda i))}{D(\lambda i)} \right)^2} \quad (10)$$

$$h^*(T) = \sqrt{\frac{h(T)}{n}} \quad (11)$$

From the standpoint of theory of errors, since errors are evaluated regardless of the number n of wavelength, further a square root of least square error h*(T) as shown in equation (11) is calculated from h(T) thus obtained as described heretofore. The aforesaid calculation is repeatedly performed by changing T to obtain T where h*(T) becomes minimum. The temperature which makes h*(T) minimum is outputted as the temperature of the target to be measured.

Figure 4:
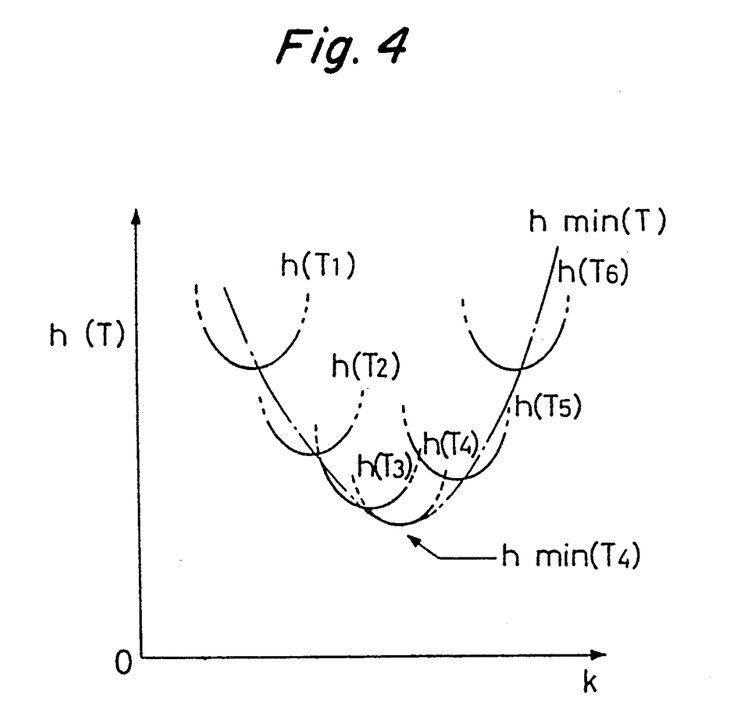
FIG. 4 is a graph showing a principle of the present invention.

FIG. 4 shows a graph in which aforesaid mathematic meanings are all illustrated. First, six temperatures are taken as $T_1, T_2, \ldots T_6$, which are substituted in equation (9) successively one by one to obtain a quadratic functional graph. For example, when $T_1$ is substituted in equation (9), a curve is obtained as $h(T_1)$ by the value k, and representing h(T) at $T=T_1$. Its minimum point is hmin(T) when $T=T_1$ in equation (11). Now, assuming hmin(T) of this point is hmin($T_1$) and substituting $T_2$, $T_3$, ... $T_6$ similarly, the same curves are obtained successively and respective minimum values hmin($T_2$), hmin($T_3$), ... hmin($T_6$) are obtained. A curve connecting these values forms a curve shown by hmin(T). The minimum value as a whole in this case is at $T_4$, which is the required temperature.

In practice, the temperature of the target to be measured may be decided by, (i) obtaining T which becomes minimum within the temperature range determined by various restricting conditions [$\epsilon(\lambda, T) \leq 1$ etc.] and measuring conditions, (ii) obtaining T which makes h*(T) extremely small and (iii) deciding a certain small range Δ to obtain T where dh*(T)/dT becomes smaller than Δ.

Figure 5:
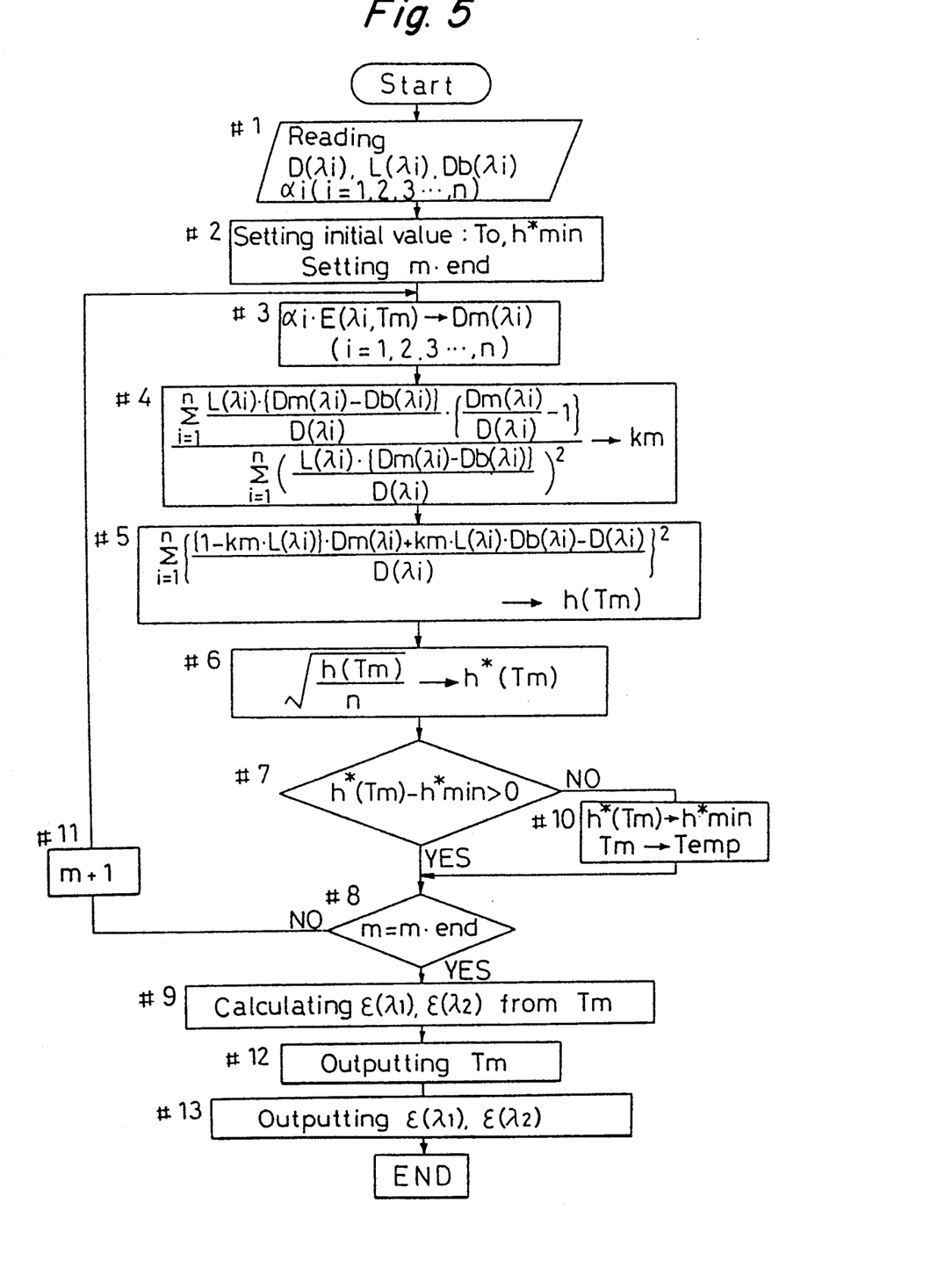
FIG. 5 is a flow chart of one embodiment of a calculation operation.
Figure 6:
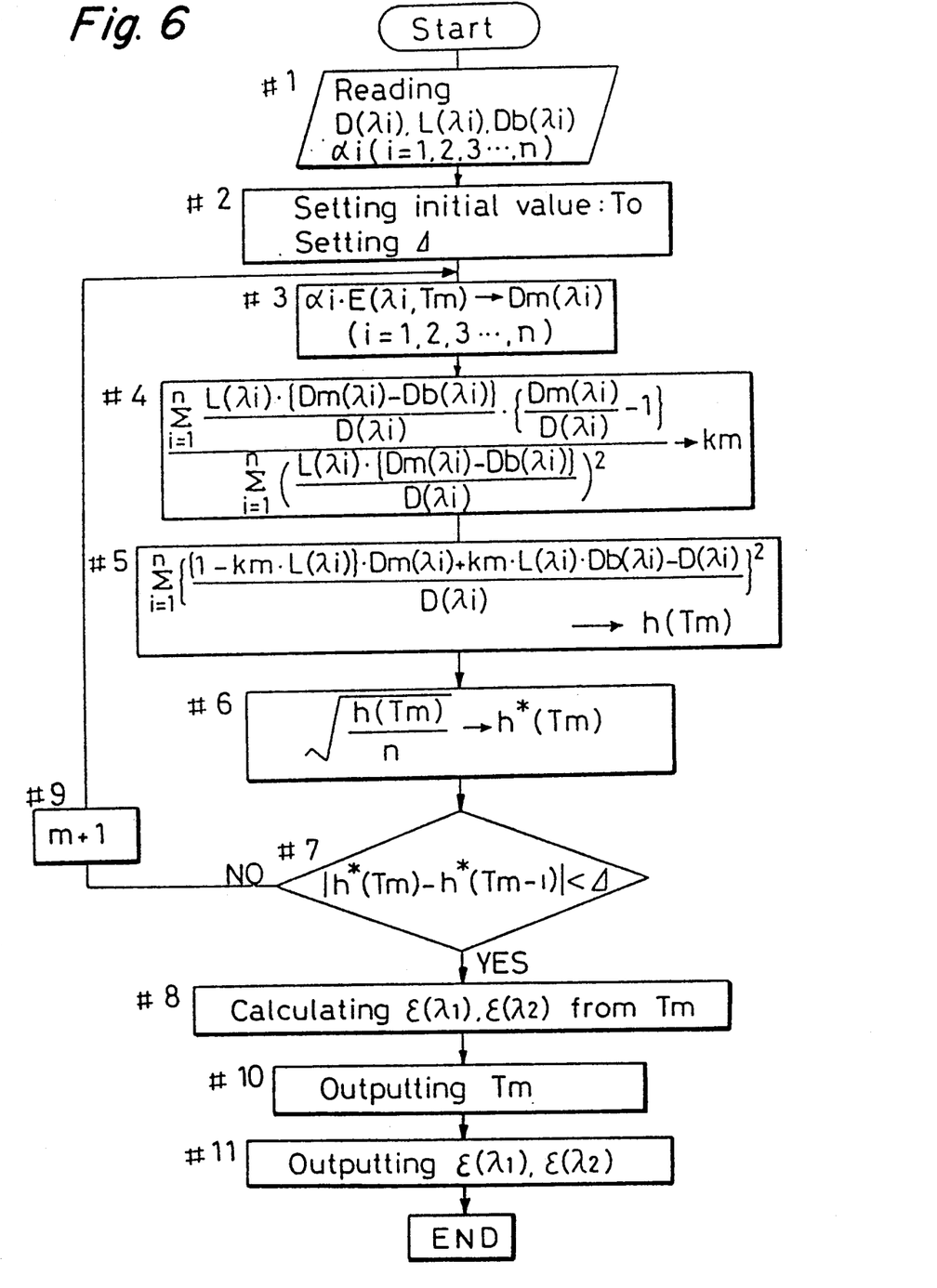
FIG. 6 is a flow chart showing an example of a different calculating operation.

FIGS. 5 and 6 show flow charts of calculation programs for obtaining the temperature in the calculating circuit TC by the methods aforementioned.

First, in the embodiment of FIG. 5, in (#1), the radiation intensity measured value D(λi), measured reflectance L(λi), background radiation intensity measured value Db(λi) and optical constant ai are read from the measured value. Next, in (#2), a calculation starting temperature of the temperature T which is substituted in the above equations (9)~(11) is set at $T_0$, and the number of calculations from said $T_0$ to the measured temperature range at m.end respectively. For example, when setting the number of calculations of 500 within the temperature range from 1° C. to 500° C., 1° C. is set for $T_0$ and 500° for m.end. A numerical value is set also for h*min in (#2), which is compared to h*(Tm) obtained as to be described later, and replaced by h*(Tm) when the latter is smaller, thus any relatively large value may be selected because it is an initial value in the process wherein data of every calculated results performed by changing the temperature are compared successively to obtain finally the smallest value. Next, Dm(λi) is obtained from the optical constant ai of each wavelength and energy E(λi, Tm) emitted from the blackbody having the temperature Tm (#3). Thereafter, Dm(λi) and D(λi) and L(λi), Db(λi) read in (#1) are substituted in the equation shown in (#4) to obtain km. This equation corresponds to equation (10) aforementioned. Next, values of km, D(λi), Dm(λi), L(λi), Db(λi) are substituted in the equation shown in (#5) to obtain h(Tm). In addition, h*(Tm) is calculated from h(Tm) and n (#6). In (#7), h*(Tm) and h*min are compared and when the former is smaller, h*min is made equal to h*(Tm) and the temperature Temp is made equal to Tm in (#10) before proceeding to (#8). When h*(Tm) is larger, proceeding directly to (#8), wherein it is checked whether m equals m.end, if not returned to (#3) as incrementing m by 1 (#11), if yes Temp is the required temperature. Emissivities $\epsilon(\lambda_1)$, $\epsilon(\lambda_2)$ at respective wavelengths ($\lambda_1$) ($\lambda_2$) at the temperature (Temp)

are obtained again (#9) by using equation (6), and outputting these data to the indicating part IP (#12) (#13) to indicate the temperature (Temp) and emissivities $\epsilon(\lambda_1)$, $\epsilon(\lambda_2)$ to complete the calculation flow. Thus, the true temperature is obtained. An example of indication is shown the display 109 in FIG. 8.

Next, in the embodiment of FIG. 6, a small threshold value $\Delta$ is prepared in advance and a temperature at the time when the difference between h*(Tm) obtained by two successive calculations becomes smaller than the threshold value $\Delta$ is determined as the true temperature, thus the whole calculations are not necessarily performed as in the case of FIG. 5, so that the calculation time can be reduced. It will be appreciated from a graph of FIG. 4 that the temperature Tm at the time when the difference between two successive h*(Tm) becomes smallest is the true temperature.

In FIG. 6, first the radiation intensity measured value $D(\lambda i)$, measured reflectance $L(\lambda i)$, background radiation intensity measured value $Db(\lambda i)$ and optical constant $\alpha i$, are read in (#1). Then, in (#2), the calculation starting temperature is set at $T_0$ and the threshold value at $\Delta$. Thereafter, $Dm(\lambda i)$ obtained in (#3) from the optical constant $\alpha i$, of each wavelength and energy $E(\lambda i, Tm)$ radiated from a blackbody of temperature Tm, and $L(\lambda i)$, $D(\lambda i)$, $Db(\lambda i)$ read previously are substituted in the equation shown in (#4) to obtain km. Then, h(Tm) is calculated from km and $L(\lambda i)$, $Dm(\lambda i)$, $D(\lambda i)$, $Db(\lambda i)$ in (#5). h*(Tm) can be readily calculated from h(Tm) and n in (#6). In (#7), it is determined whether the difference between h*(Tm) and h*(T$_{m-1}$) calculated at the previous temperature is smaller than the threshold value $\Delta$, if larger, returning to (#3) as incrementing m (#9) and repeating the flow from (#3) onward. If smaller than $\Delta$, emissivities $\epsilon(\lambda_1)$, $\epsilon(\lambda_2)$ at each wavelength $\lambda_1$, $\lambda_2$ at the temperature Tm are obtained again in (#8) as deeming the temperature Tm at that time as the true temperature, and these data are outputted to the indicating part IP (#10), (#11) to indicate the temperature Tm and emissivities $\epsilon(\lambda_1)$, $\epsilon(\lambda_2)$. Meanwhile, T$_{m-1}$ may be outputted as the true temperature in lieu of Tm.

In the aforesaid embodiments, though the emissivity $\epsilon$ has been assumed as $$\epsilon(\lambda, T) = 1 - k \times L(\lambda)$$

as shown in equation (8), when k is variable on wavelength, temperature errors become relatively larger.

Therefore, in another embodiment of the present invention, the temperature is obtained as assuming, $$\epsilon(\lambda, T) = 1 - k(\lambda) \times L(\lambda) \tag{12}$$

where, k is a function of wavelength $\lambda$.

Here, $k(\lambda)$ is a function of $\lambda$ including less than (n−1) unknowns when the number of wavelengths used is represented by n.

Two calculating methods for obtaining the temperature on the basis of such assumption will be explained hereinbelow.

FIRST CALCULATING METHOD

If $k(\lambda)$ is a function including (n−1) unknowns, the unknowns are totally n consisting of (n−1) unknowns and a temperature T. Thus, since wavelengths of n colors are used, the number of unknowns and conditional equations are coincided to give solution. As a specific example, calculation using three wavelengths and assuming $k(\lambda)$ as the following equation is shown.

$$k(\lambda) = a_0 + a_1 \cdot \lambda \tag{13}$$

For $\lambda_1$, from equations (1) and (2), $$\epsilon(\lambda, T) \cdot D_0(\lambda_1) = D(\lambda_1),$$

and from equations (12) and (13), $$\{1 - (a_0 + a_1 \cdot \lambda_1) L(\lambda_1)\} \times D_0(\lambda_1) = D(\lambda_1),$$

thus $$a_0 + a_1 \cdot \lambda_1 = F_1$$

where, $$F_1 = \{1 - D(\lambda_1)/D_0(\lambda_1 T)\}/L(\lambda_1).$$

Similarly, also for $\lambda_2$, $\lambda_3$, $$a_0 + a_1 \cdot \lambda_2 = F_2$$

$$a_0 + a_1 \cdot \lambda_3 = F_3.$$

When eliminating $a_0$, $a_1$, $$(F_2 - F_1)/(\lambda_2 - \lambda_1) = (F_3 - F_2)/(\lambda_3 - \lambda_2) \tag{14}$$

It is not possible to solve equation (14) analytically with respect to the temperature T. However, $E(\lambda, T)$ can be calculated by the Planck formula relative to a certain temperature T, thereby $D_0(\lambda, T)$ can be obtained from equation (1). Since F can be calculated from the measured values $D(\lambda)$, $L(\lambda)$, left and right sides of equation (14) are obtained.

By repeating the calculation for several Ts prepared in advance, T satisfying equation (14) can be obtained. The temperature T at this time can be deemed as the temperature of the target to be measured. If three wavelengths are selected to satisfy $$\lambda_2 = (\lambda_1 + \lambda_3)/2,$$

equation (14) becomes $$2F_2 = F_1 + F_3 \tag{05}$$

The equation (15) looks simple and seems to be easy to calculate.

SECOND CALCULATING METHOD

A second calculating method is to calculate a temperature by taking errors into account from the beginning. That is, though accuracy of the calculated temperature is decided by assuming $k(\lambda)$ in the assumption of equation (12), errors are possibly involved whatever $k(\lambda)$ is introduced. As described in the previous embodiments, in practice, measured errors are inevitable in the measured values. Therefore, temperature calculation is performed in the following manner.

A function h(T) is defined as the function which evaluates the errors of assumed radiation intensity, $$\epsilon(\lambda) \times D_0(\lambda, T) [ = \{1 - k(\lambda) \times L(\lambda)\} \times D_0(\lambda, T)]$$

and radiation intensity measured value $D(\lambda)$.

As a specific example, the background radiation intensity $Db(\lambda)$ is measured by using the wavelengths of n colors ($n \geq 3$), or by using $Db(\lambda)$ inputted from the background radiation intensity input circuit DI when $Db(\lambda)$ is known, taking into account of removing influence of background radiation and defining $h(T)$ as a sum of squares every wavelength of the difference between the assumed radiation intensity $[\epsilon(\lambda, T) \times D_0(\lambda, T) + \{1-\epsilon(\lambda, T)\}Db(\lambda)]$ and radiation intensity measured value $D(\lambda)$, the temperature is calculated as assuming $k(\lambda) = 1/\{a' \times k'(\lambda)\}$ from equations (6) and (7). The equation of $h(T)$ is shown in the following equations (16) (17).

$$h(T) = \sum_{i=1}^{n} \left[ \frac{\{\epsilon(\lambda i, T) \times D_0(\lambda i, T) + (1 - \epsilon(\lambda i, T)) \times Db(\lambda i)\} - D(\lambda i)}{D(\lambda i)} \right]^2 \quad (16)$$

$$h(T) = \sum_{i=1}^{n} [A_i a_0 + B_i a_1 - C_i]^2 \quad (17)$$

Since equation (17) is a quadratic equation of unknowns $a_0$, $a_1$, $a_0(=a_0\min)$ and $a_1(=a_1\min)$ which minimize $h(T)$ relative to a certain temperature T are $a_0$ and $a_1$ at the extreme value of $h(T)$. Accordingly, they can be obtained from equations $2h(T)/2a_0 = 0$ and $2h(T)/2a_1 = 0$.

These $a_0\min$ and $a_1\min$ are shown in vertical matrixes as equation (18).

$$A_i = \frac{L(\lambda i) \times \{D_0(\lambda i, T) - Db(\lambda i)\}}{D(\lambda i)}$$

$$B_i = \frac{\lambda i \times L(\lambda i) \times \{D_0(\lambda i, T) - Db(\lambda i)\}}{D(\lambda i)}$$

$$C_i = \frac{D_0(\lambda i, T)}{D(\lambda i)} - 1$$

$$\begin{pmatrix} a_{0min} \\ a_{1min} \end{pmatrix} = \frac{1}{\sum_{i=1}^{n} A_i^2 \cdot \sum_{i=1}^{n} B_i^2 - \left(\sum_{i=1}^{n} A_i B_i\right)^2}$$

$$\begin{pmatrix} \sum_{i=1}^{n} B_i^2 \cdot \sum_{i=1}^{n} A_i C_i - \sum_{i=1}^{n} A_i B_i \cdot \sum_{i=1}^{n} B_i C_i \\ \sum_{i=1}^{n} A_i^2 \cdot \sum_{i=1}^{n} B_i C_i - \sum_{i=1}^{n} A_i B_i \cdot \sum_{i=1}^{n} A_i C_i \end{pmatrix} \quad (18)$$

$a_0\min$ and $a_1\min$ shown in equation (18) are substituted in equation (17) to obtain $h(T)$. From $h(T)$ thus obtained, further a square root of least square error $h^*(T)$ as shown in equation (19) is calculated.

$$h^*(T) = \sqrt{\frac{h(T)}{n}} \quad (19)$$

T may be searched by repeating the aforesaid calculation as changing T until smallest $h^*(T)$ is obtained. The temperature which makes smallest $h^*(T)$ is outputted as the temperature of the target to be measured.

Figure 8:
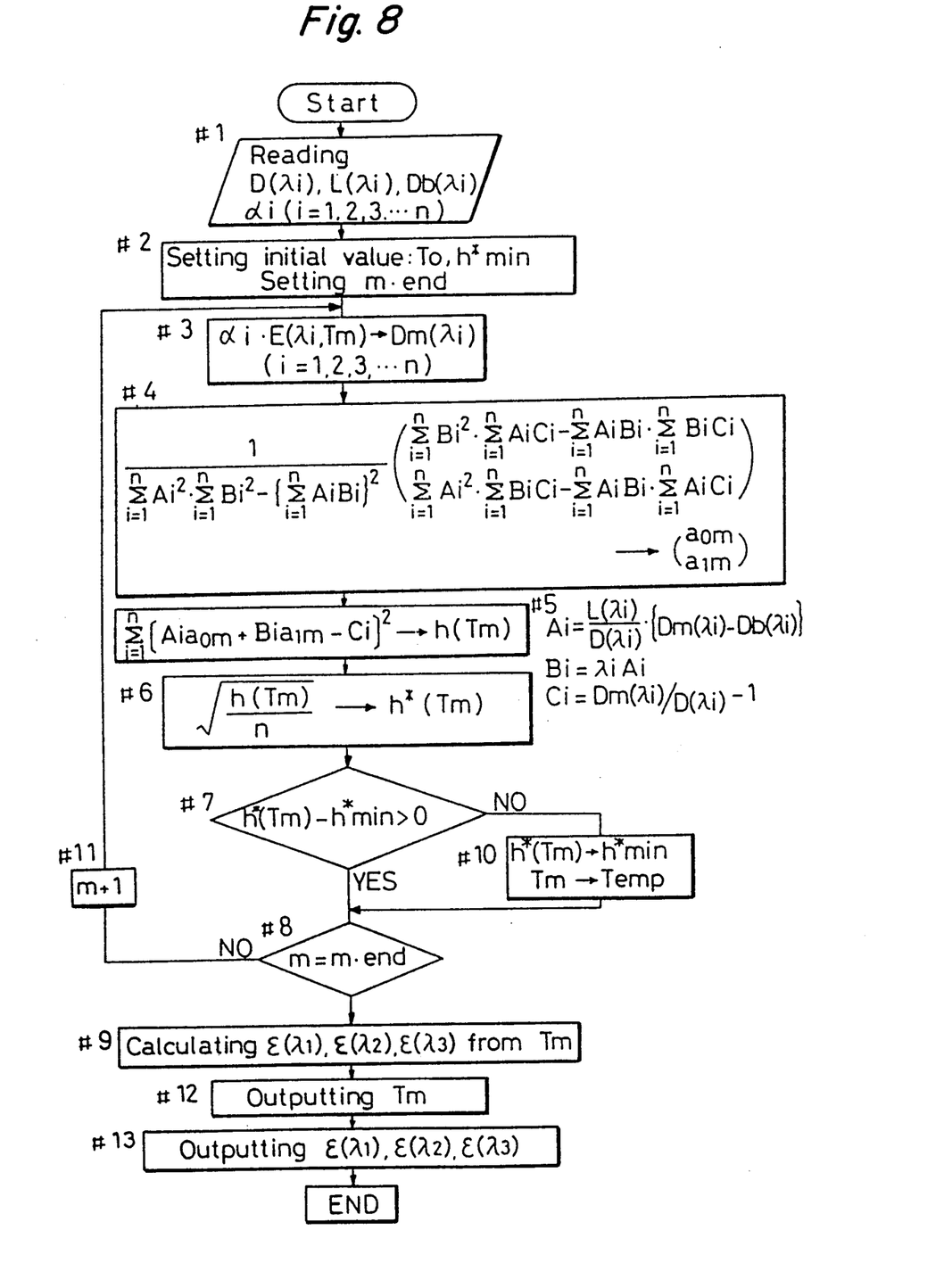
FIG. 8 and FIG. 9 are flow charts of the calculating operations relative to equations 16 through 19.
Figure 9:
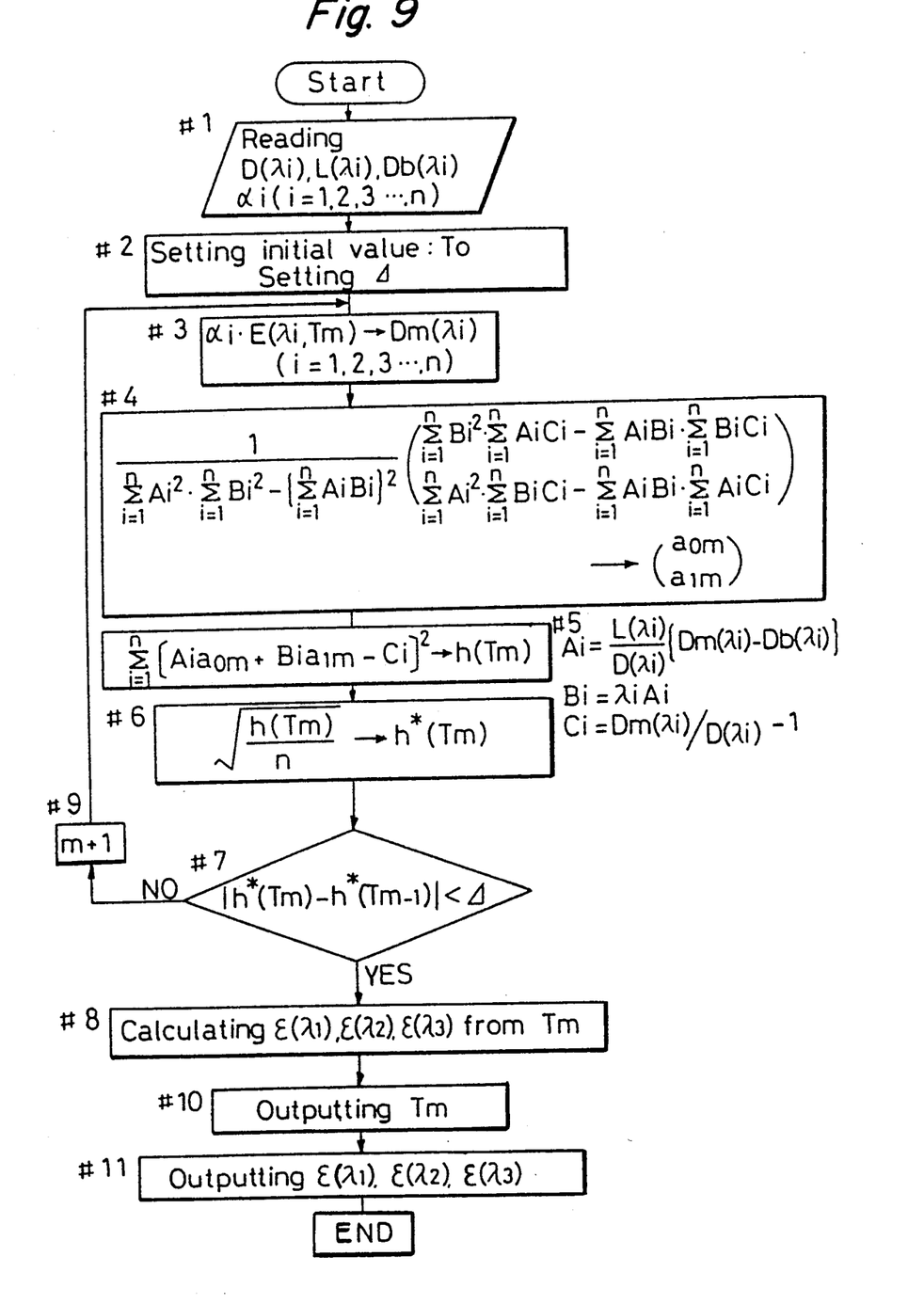

FIGS. 8 and 9 show flow charts of calculating programs for obtaining a correct solution in a calculating circuit TC according to the second calculating method described hereinabove.

Figure 7:
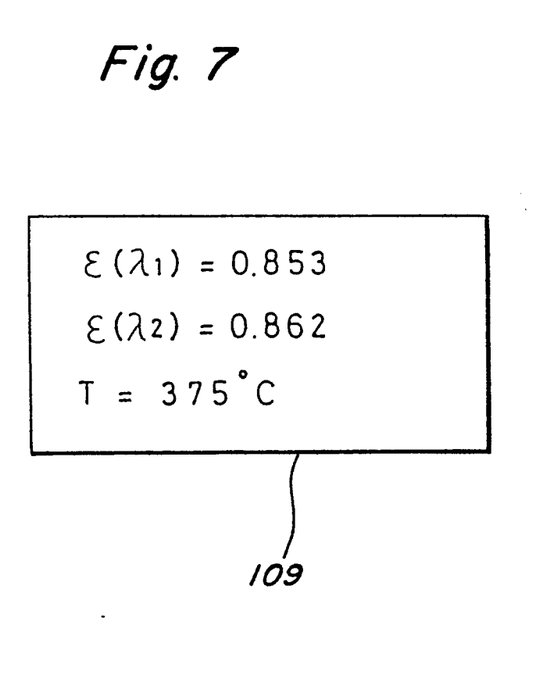
FIG. 7 is a view showing an example of a display in an indicating part.

These flow charts in FIGS. 8 and 9 are respectively in proportion to the flow charts in FIGS. 6 and 7, and their procedures are also similar, therefore its explanation will be omitted.

However, since FIGS. 8 and 9 are for the case of three wavelengths, calculation of the emissivity in (#9) and its output in (#13) of FIG. 8 are also performed for $\epsilon(\lambda_3)$. Similarly, also in steps (#8), (#11) of FIG. 9, calculation and output for $\epsilon(\lambda_3)$ are respectively performed besides $\epsilon(\lambda_2)$ and $\epsilon(\lambda_3)$. In this case, the value of $\epsilon(\lambda_3)$ is added to the indication in FIG. 7.

Having described the present invention as related to the embodiments, the present invention is not limited thereto various changes and modifications are possible without departing from the scope and spirit of the invention claimed in the appended claims. For example, though an estimating function $h(T)$ is defined as a sum of every wavelength of square of the difference between the assumed radiation intensity and radiation intensity measured value $D(\lambda)$ as equations (9) and (16), and $h(T)$ may be acceptable if it is a function for estimating errors of the assumed radiation intensity and radiation intensity measured value. For example, it may be the sum of every wavelength of a differential absolute value of the assumed radiation intensity and radiation intensity measured value. In that case, evaluation of errors is made as $h^*(T) = h(T)/n$ in lieu of equations (11) and (19).

In the aforesaid embodiments, though the back ground radiation intensity $Db(\lambda)$ is measured or inputted to remove influence of the background radiation, it may be calculated as $Db(\lambda) = \beta(\lambda)D_0(\lambda, Ts)$ by measuring or inputting the typical peripheral temperature Ts, and a contribution factor of energy radiated from the target of temperature Ts with respect to the whole background radiation intensity.

Though the embodiments shown in FIGS. 1 and 2 are for three wavelengths, two wavelengths may be employed, as described above, if $\epsilon(\lambda, T) = 1 - k \times L(\lambda)$ is assumed. When $\epsilon(\lambda, T) = 1 - k(\lambda) \times L(\lambda)$ is assumed, more than four wavelengths are also acceptable. In this case, the number of detectors, amplifiers etc. may just be changed.

Though an optical fiber FB is used for dividing light in FIG. 2, a half-mirror may be used or three filters may be moved in and out alternately mechanically. With respect to a light source, pulse light such as a flash device may be used in place of a chopper.

What is claimed is:

1. A pyrometer comprising:
   light producing means for producing light having at least two different wavelength components;
   a first optical fiber, one end of which is operatively connected to the light producing means and the other end of which is directed to a target for delivering the two different wavelength components;
   light measuring means for measuring an intensity of the light for each wavelength component;
   target light measuring means, provided for each wavelength component, for measuring an intensity of light from the target with respect to a corresponding wavelength component;
   a second optical fiber member having at least a plurality of optical fibers of the same number as the wavelength components, each of the optical fibers being directed to the corresponding target light measuring means for each wavelength so that the target light is introduced to each target light measuring means, and provided separately from said first optical fiber member; and
   temperature calculating means for calculating a temperature of the target on the basis of measured values obtained by the light measuring means and the target light measuring means.

2. A pyrometer as claimed in claim 1, in which the target light measuring means comprises:
   reflected light measuring means for measuring reflected light of the light from the target for each wavelength component, and
   radiated light measuring means for measuring light radiated by the target for each wavelength component.

3. A pyrometer as claimed in claim 2, further comprising light emission controlling means for periodically emitting the light to the target, and in which the reflected light measuring means measures intensity of the reflected light on the basis of the intensity of the target light during both light emission and nonemission, and the radiated light measuring means measures the intensity of the target light during nonemission of the light.

4. A pyrometer as claimed in claim 2, further comprising emissivity assuming means for assuming an emissivity value of the target on the basis of the following equation:

$$\epsilon(\lambda) = 1 - k \times L(\lambda)$$

wherein:
   $\epsilon(\lambda)$ represents an assumed emissivity value of the target with respect to a wavelength $\lambda$;
   k represents a constant, and
   $L(\lambda)$ represents information as to a measured value of the wavelength $\lambda$.

5. A pyrometer as claimed in claim 4, in which the temperature calculating means calculates the temperature of the target on the basis of a minimum value of a difference between an assumed radiation intensity, calculated according to the assumed emissivity of the target, and a measured radiation intensity.

6. A pyrometer as claimed in claim 5, in which the temperature calculating means includes means for calculating the temperature of the target, on the basis of a minimum sum of the squares for each wavelength, the minimum sum being the difference between the assumed radiation intensity and the measured radiation intensity.

7. A pyrometer as claimed in claim 5, in which the temperature calculating means includes means for calculating the temperature of the target, on the basis of a minimum sum of the absolute values for each wavelength, the absolute value being the difference between the assumed radiation intensity and the measured radiation intensity.

8. A pyrometer as claimed in claim 1, further comprising a condenser lens for condensing the light emitted through the first optical fiber and also condensing the target light to transmit it to the second optical fiber member.

9. A pyrometer as claimed in claim 8, in which the light is emitted toward the target through the center portion of the condenser lens, while the target light is passed through the peripheral portion of the condenser lens to reach the second optical fiber member.

10. A pyrometer as claimed in claim 1, in which an end of the second optical fiber member is directed to the target, and the other ends of the optical fibers are directed respectively to each target light measuring means.

11. A pyrometer comprising:
    (a) light emitting means for emitting light having at least two wavelengths to a target to be measured;
    (b) first light measuring means for measuring light emitted by said light emitting means with respect to said at least two wavelengths to produce first signals;
    (c) second light measuring means for measuring light reflected by the target with respect to said at least two wavelengths to produce second signals;
    (d) third light measuring means for measuring intensity of light radiated by the target with respect to said at least two wavelengths to produce third signals;
    (e) emissivity assuming means for assuming an emissivity of the target on the basis of the following equation:

$$\epsilon(\lambda) = 1 - k \times L(\lambda)$$

$\epsilon(\lambda)$ represents an assumed emissivity of the target with respect to a wavelength $\lambda$;
    k represent a constant; and
    $L(\lambda)$ represent information as to the first and second signals at a wavelength $\lambda$, and
    (f) temperature calculating means for calculating a temperature of the target, on the basis of the minimum value of the difference at each wavelength between an assumed radiation intensity calculated according to the assumed emissivity of the target and a measured radiation intensity according to the third signals, and wherein the temperature calculating means includes means for calculating the temperature of the target, on the basis of the minimum sum of the absolute values for every wavelength, said absolute value being the difference between the assumed radiation intensity and the measured radiation intensity.

12. A pyrometer comprising:
    (a) light emitting means for emitting light having at least two wavelengths to a target to be measured;
    (b) first light measuring means for measuring light emitted by said light emitting means with respect to said at least two wavelengths to produce first signals;

(c) second light measuring means for measuring light reflected by the target with respect to said at least two wavelengths to produce second signals;

(d) third light measuring means for measuring intensity of light radiated by the target with respect to said at least two wavelengths to produce third signals;

(e) emissivity assuming means for assuming an emissivity of the target on the basis of the following equation:

$$\epsilon(\lambda) = 1 - k \times L(\lambda)$$

$\epsilon(\lambda)$ represents an assumed emissivity of the target with respect to a wavelength $\lambda$;

k represents a constant; and $L(\lambda)$ represents information as to the first and second signals at a wavelength $\lambda$;

(f) temperature calculating means for calculating a temperature of the target, on the basis of the minimum value of the difference at each wavelength between an assumed radiation intensity calculated according to the assumed emissivity of the target and a measured radiation intensity according to the third signals;

(g) means for calculating an emissivity of the target at the calculated temperature;

(h) means for indicating the calculated emissivity at the calculated temperature; and (i) means for indicating the calculated temperature.

13. A pyrometer as claimed in claim 12, wherein the temperature calculating means includes means for calculating the temperature of the target, on the basis of the minimum sum of the squares for every wavelength, each of said squares being the difference between the assumed radiation intensity and the measured radiation intensity.

14. A pyrometer comprising:

(a) light emitting means for emitting light having at least two wavelengths to a target to be measured;

(b) first light measuring means for measuring light emitted by said light emitting means with respect to said at least two wavelengths to produce first signals;

(c) second light measuring means for measuring light reflected by the target with respect to said at least two wavelengths to produce second signals;

(d) third light measuring means for measuring intensity of light radiated by the target with respect to said at least two wavelengths to produce third signals;

(e) emissivity assuming means for assuming an emissivity of the target on the basis of the following equation:

$$\epsilon(\lambda) = 1 - k \times L(\lambda)$$

$\epsilon(\lambda)$ represents an assumed emissivity of the target with respect to a wavelength $\lambda$;

k represents a constant; and $L(\lambda)$ represents information as to the first and second signals at a wavelength $\lambda$;

(f) temperature calculating means for calculating a temperature of the target, on the basis of the minimum value of the difference at each wavelength between an assumed radiation intensity calculated according to the assumed emissivity of the target and a measured radiation intensity according to the third signals, and (g) means for supplying a background radiation intensity of light coming from a background of the target, and wherein the temperature calculating means includes means for calculating the temperature of the target, on the basis of the minimum difference between the measured radiation intensity and the sum of the background radiation intensity and the assumed radiation intensity.

15. A pyrometer as claimed in claim 14, wherein said supplying means includes means for measuring light coming from a background with respect to at least two different wavelengths to produce a background radiation intensity.

16. A pyrometer as claimed in claim 14, wherein said supplying means includes means for setting a background radiation intensity.

17. A pyrometer comprising:

(a) light emitting means for emitting light having at least three wavelengths to a target to be measured;

(b) first light measuring means for measuring light emitted by said light emitting means with respect to said at least three wavelengths to produce first signals;

(c) second light measuring means for measuring light reflected by the target with respect to said at least three wavelengths to produce second signals;

(d) third light measuring means for measuring intensity of light radiated by the target with respect to said at least three wavelengths to produce third signals;

(e) emissivity assuming means for assuming an emissivity of the target on the basis of the following equation:

$$\epsilon(\lambda) = 1 - k(\lambda) \times L(\lambda)$$

wherein:

$\epsilon(\lambda)$ represents an assumed emissivity of the target with respect to a wavelength $\lambda$;

$k(\lambda)$ represents a function of wavelength $\lambda$, including an unknown which is smaller than a number of wavelengths;

$L(\lambda)$ represents information as to the first and second signals with respect to a wavelength $\lambda$, and (f) temperature calculating means for calculating a temperature of the target on the basis of the assumed emissivity and the first to third signals at each wavelengths.

18. A pyrometer as claimed in claim 17, wherein the emissivity assuming means includes means for assuming $k(\lambda)$ according to the following equation:

$$k(\lambda) = a_0 + a_1 \times \lambda$$

wherein:

$a_0$ represents a constant;

$a_1$ represents a constant;

$\lambda$ represents a wavelength; and the temperature calculating means includes means for selecting the temperature of the target among a plurality of predetermined temperatures which fulfill the following condition:

$$(F_2 - F_1)/(\lambda_2 - \lambda_1) = (F_3 - F_2)/(\lambda_3 - \lambda_2)$$

wherein:

$\lambda_i$ (i=1, 2, 3) represents the three different wavelengths respectively; and Fi(i=1, 2, 3) represents as follows:

$$Fi = \{1 - D(\lambda_i)/D_0(\lambda_i)\}/L(\lambda_i)$$

Wherein:

$D(\lambda_i)$ represents the measured radiation intensity with respect to a wavelength $\lambda_i$;

$D_0(\lambda_i)$ represents a measured radiation intensity of a blackbody measured by the pyrometer, with respect to a wavelength $\lambda_i$, which is obtained on the basis of a predetermined radiation intensity of the blackbody and a constant peculiar to the pyrometer, and $L(\lambda_i)$ represents information as to the second signal with respect to a wavelength $\lambda_i$.

19. A pyrometer as claimed in claim 17, further comprising means for supplying a background radiation intensity of light coming from a background of the target, and wherein the temperature calculating means includes means for calculating the temperature of the target, on the basis of the minimum difference between the measured radiation intensity and the sum of the assumed radiation intensity, calculated according to the assumed emissivity of the target and the background radiation intensity.

20. A pyrometer comprising:
   (a) light emitting means for emitting light having at least three wavelengths to a target to be measured;
   (b) first light measuring means for measuring light emitted by said light emitting means with respect to said at least three wavelengths to produce first signals;
   (c) second light measuring means for measuring light reflected by the target with respect to said at least three wavelengths to produce second signals;
   (d) third light measuring means for measuring light radiated by the target with respect to said at least three wavelengths to produce third signals;
   (e) emissivity assuming means for assuming an emissivity of the target on the basis of the following equation:

$$\epsilon(\lambda) = 1 - k(\lambda) \times L(\lambda)$$

wherein:
   $\epsilon(\lambda)$ represents an assumed emissivity of the target with respect to a wavelength $\lambda$;
   $k(\lambda)$ represents a function of wavelength $\lambda$;
   $L(\lambda)$ represents information as to the first and second signals with respect to a wavelength $\lambda$;
   (f) temperature calculating means for calculating a temperature of the target on the basis of the assumed emissivity and the first to third signals at each wavelength;
   (g) means for indicating the calculated temperature;
   (h) means for calculating an emissivity of the target at the calculated temperature, and
   (i) means for indicating the calculated emissivity at the calculated temperature.

21. A pyrometer as claimed in claim 20, wherein the temperature calculating means includes means for calculating the temperature of the target, on the basis of the minimum value of the difference between an assumed radiation intensity calculated according to the assumed emissivity of the target and a measured radiation intensity according to the third signals.

22. A pyrometer as claimed in claim 20, wherein the light emitting means for emitting light emits at least three wavelengths to the target to be measured.

23. A pyrometer comprising:
   (a) light emitting means for emitting light having at least three wavelengths to a target to be measured;
   (b) first light measuring means for measuring light emitted by said light emitting means with respect to said at least three wavelengths to produce first signals;
   (c) second light measuring means for measuring light reflected by the target with respect to said at least three wavelengths to produce second signals;
   (d) third light measuring means for measuring light radiated by the target with respect to said at least three wavelengths to produce third signals;
   (e) emissivity assuming means for assuming an emissivity of the target on the basis of the following equation:

$$\epsilon(\lambda) = 1 - k(\lambda) \times L(\lambda)$$

wherein:
   $\epsilon(\lambda)$ represents an assumed emissivity of the target with respect to a wavelength $\lambda$;
   $k(\lambda)$ represents a function of wavelength $\lambda$;
   $L(\lambda)$ represents information as to the first and second signals with respect to a wavelength $\lambda$, and
   (f) temperature calculating means for calculating a temperature of the target on the basis of the assumed emissivity and the first to third signals at each wavelength;
   (g) emissivity calculating means for calculating the emissivity of the target with respect to each wavelength on the basis of the calculated temperature, and
   (h) indicating means for indicating the calculated temperature and the calculated emissivity with respect to each wavelength.

* * * * *